UNITED STATES PATENT OFFICE.

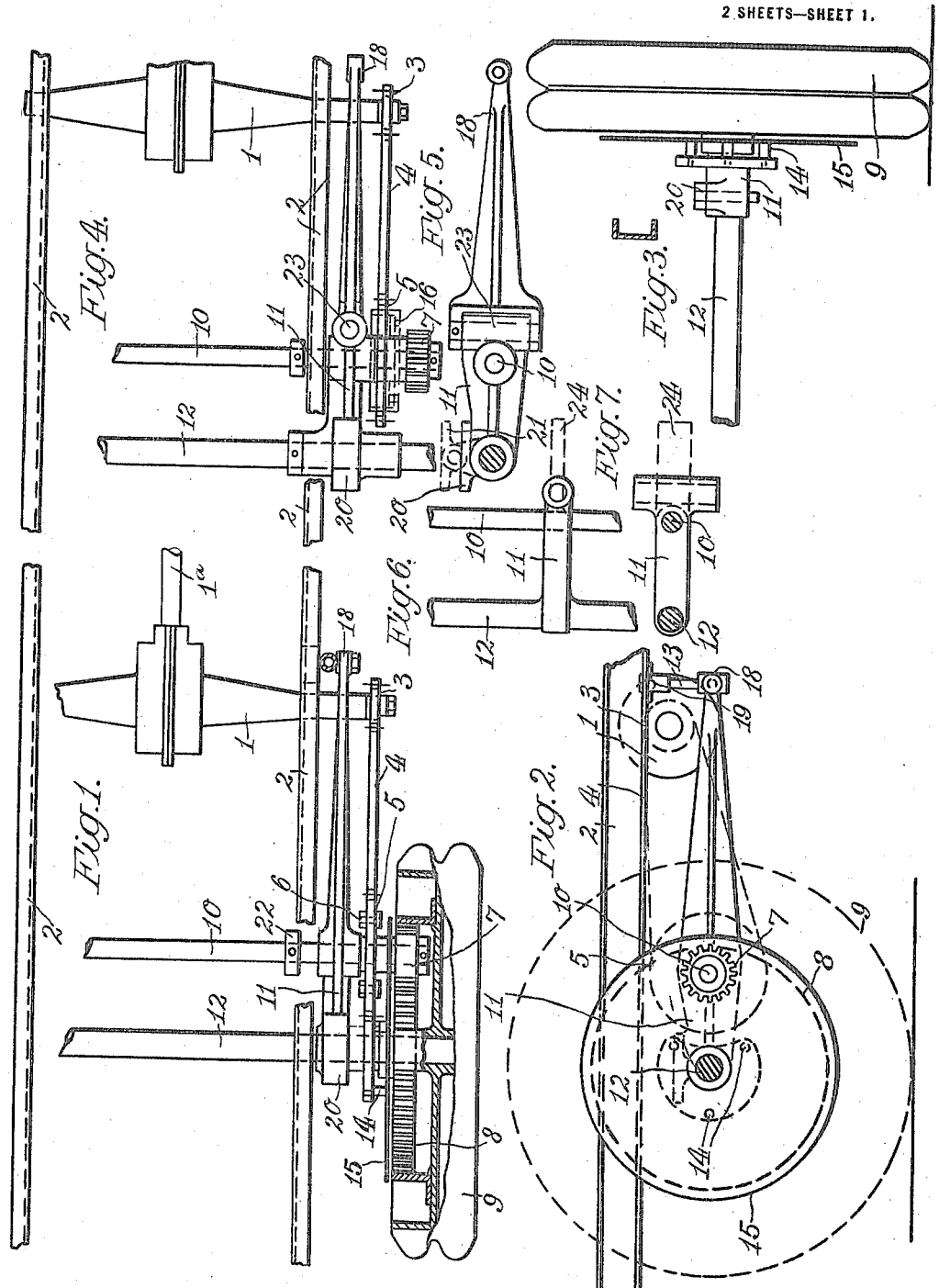

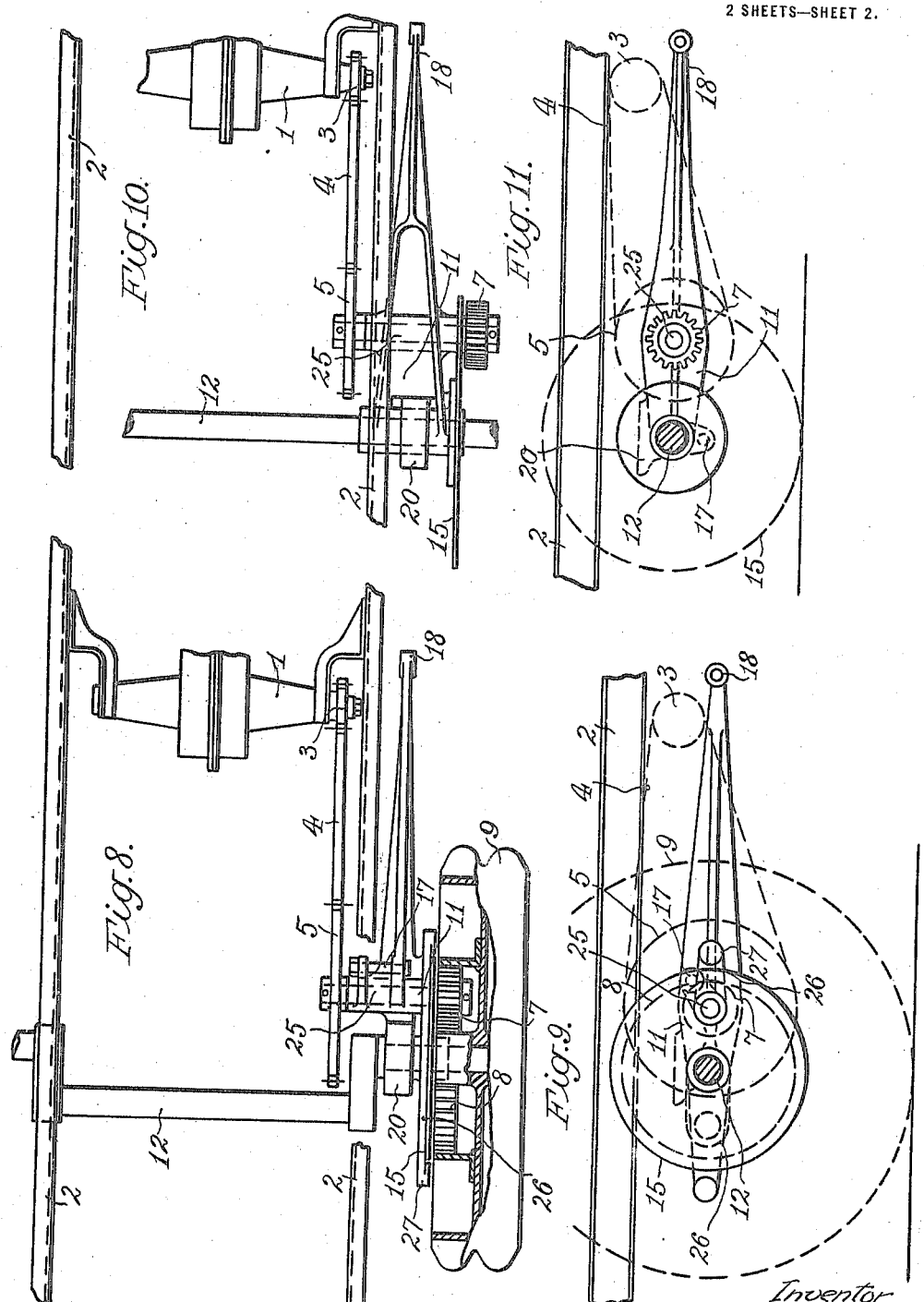

JAMES REGINALD CHURCHILL, OF SHEFFIELD, ENGLAND.

CHASSIS FOR CHAIN-DRIVEN MOTOR-VEHICLES.

1,273,150.   Specification of Letters Patent.   Patented July 23, 1918.

Application filed January 4, 1916. Serial No. 70,238.

*To all whom it may concern:*

Be it known that I, JAMES REGINALD CHURCHILL, a subject of His Majesty the King of England, residing at Sheffield, in the county of York, Kingdom of England, have invented certain new and useful Improvements in Chassis for Chain-Driven Motor-Vehicles, of which the following is a specification.

This invention relates to improvements in chain driven chassis for motor vehicles fitted with internal combustion engines whose axes are arranged longitudinally or lengthwise with regard to the chassis, and its objects are the production of a chassis in which a very great reduction of speed between the engine and road wheels may be obtained without the necessity for undue reduction to be provided in the chain drive or between the engine and the countershaft, and also to render possible the use of chain sprockets whose ground clearance may be very much greater than has hitherto been possible with known methods of construction. As hitherto constructed, chain driven chassis of the kind in question have comprised side chains arranged to perform the final drive to sprockets attached to the road wheels.

According to this invention, I employ for the driving of each of the two rear wheels, a gear pinion rotatably interconnected with a chain sprocket, the latter receiving the drive through a chain from a chain pinion upon the differential countershaft and the aforesaid gear pinion meshing with a gear ring or wheel secured to the said road wheel. Thus the chains perform the semi-final stage of the transmission and the gear pinions and wheels provide a still further stage in the transmission and a means whereby any further reduction of speed as between engine and road wheels may be effected. In certain important details and various combinations of parts I describe and show how this double reduction may be made suitable and advantageous for such chassis.

The sprocket and pinion at each side are carried by or upon a shaft or equivalent, which, in its turn, is carried parallel with the axis of the road wheels by a fitment or fitments secured to, integral with, or mounted upon the rear axle; and any such fitment may be or form part of or be attached to a torque member adapted to be secured by a universally jointed rod to the frame of the chassis.

I will now proceed to describe this invention with reference to the accompanying drawings in which only such parts and details are shown as are necessary to the proper description of the invention and in which like parts are indicated throughout by the same numerals. These drawings only show the mechanism immediately concerned in connection with one of the two road wheels, in other words, the mechanism described will be found at each side of a chassis constructed as described.

Figure 1 is a plan, partly in section, of part of a rear axle, road wheel and adjacent parts of a chassis constructed according to this invention.

Fig. 2 is a side elevation of Fig. 1. The rear axle is shown in section and certain parts are omitted for the sake of clearness.

Fig. 3 is an end view of Fig. 1 with certain parts omitted and the frame member shown in section in its correct position relative to the wheel and axle.

Fig. 4 is a plan showing part of a rear axle and an interconnected chain sprocket and gear pinion at one side of a chassis constructed according to this invention.

Fig. 5 is a side elevation of certain of the parts shown in plan in Fig. 4.

Fig. 6 is a plan showing part of a rear axle with a fitment integral therewith.

Fig. 7 is a side view, partly in section of the parts shown in Fig. 6.

Fig. 8 is a plan, partly in section, showing part of a cranked rear axle, the chain drive being within the frame of the chassis.

Fig. 9 is a side view of certain parts shown in Fig. 8.

Fig. 10 is a plan of another modified arrangement showing part of the rear axle with the driving mechanism for one of the two rear wheels.

Fig. 11 is a side view, partly in section, of certain of the parts shown in Fig. 10.

As shown in Figs. 1 and 2 the numeral 1 indicates the differential countershaft which is attached to the sides 2, 2, of the frame of the chassis, and which is operated by the longitudinal Cardan shaft 1ª from the internal combustion engine (not shown). 3 is a chain pinion and 4 the chain which drives the sprocket 5. The sprocket 5 is secured as by bolts 6 (Fig. 1) to a flange upon the boss of the gear pinion 7, and this drives the internally toothed ring wheel 8 secured, as by bolts, to the rear wheel 9. The chain sprocket 5 and the interconnected gear pinion 7 are mounted to rotate together upon the end of a shaft or equivalent 10, which is held parallel to the rear axle 12 and toward each end by a fitment 11. This fitment 11 is firmly secured upon the said rear axle 12 and has an extension 18 by which it may be secured to the frame of the chassis by a universally jointed rod 13 (Fig. 2) which is here shown with ball joints 19. The fitment 11 with its extension 18 serves as a torque member to resist driving and braking efforts.

The usual laminated spring may be secured upon the spring pad 20 formed integral with the fitment 11 or it may be secured upon a hinged spring pad of the type shown in dotted lines at 21 (Fig. 5).

A collar 22 is shown in Fig. 1 secured to the shaft 10, between which collar and the boss of the fitment 11 a radius rod may be installed. Secured to a flange on the fitment 11 as by studs 14 is the guard plate 15 to protect the toothed gearing. A band brake may be arranged to operate upon the outside of the ring wheel 8,—the guard plate 15 or the fitment 11 being formed in any way desirable for the carrying and operation of such a brake and its mechanism. The ring wheel 8 may have external instead of internal teeth, in which case the direction of rotation of the chain pinions 3 would require to be reversed and the guard plate 15 modified to suit. In such a case the rear brake might well be of the expanding type operative within the ring wheel 8.

Fig. 3 shows in end view part of the rear axle shown at Fig. 1, with the fitment 11 surrounding it, together with the guard plate 15 and the studs 14.

Figs. 4 and 5 show modified fitments of which the extension 18 is hinged to the part 11 by the pin 23. The fitments 11 may both be firmly secured to the rear axle 12, or one may be secured thereto and the other left free, as this will insure that the rear axle is firmly held against any possibility of rotation.

The spring pad is shown at 20 and an alternative form of spring pad, hinged to the fitment, is shown dotted at 21 (Fig. 5).

At 16 Fig. 4 is shown dotted a brake drum secured to a flange formed upon the boss of the pinion 7. The fitment 11 may be modified or formed as required to carry an expanding brake and operating gear.

Figs. 6 and 7 show in plan and side elevation respectively part of a rear axle 12 with a fitment 11 forged or formed integral therewith. The dotted lines indicate a projection 24 to which a torque member may be secured as by bolts or rivets as required. In this case attached spring pads may be used.

Fig. 8 shows a cranked rear axle 12 with the fitment 11 providing a bearing or bearings for the shaft 25 to which is rotatably secured as by splines or feathers, the chain sprocket 5 at one end and the gear pinion 7 at the other end. The cranked axle 12 allows for the use of a chain sprocket 5 of relatively large diameter and an internally toothed ring wheel 8 of relatively small diameter. The spring pad is shown at 20 and a pin 17 carried in bosses formed upon the fitment 11 is provided for the attachment of the rear end of a radius rod. In this form the chains are within the frame and are thus well away from the road wheels and can be run quite exposed without harm or undue wear. They can however, be inclosed or incased as desired. At 26 are shown extensions with bosses 27 for the support and operation of a band brake. These bosses may be disposed horizontally as shown, or in any other position as desired. The guard plate 15 may be secured to these extensions 26. The fitments 11 may be both firmly secured to the rear axle 12 or one may be secured thereto and the other left free. Fig. 9 shows a side view of part of the frame and the fitment 11 as shown in plan at Fig. 8. The guard plate 15 is shown in position and the road wheel 9 together with the chain pinion, chain and chain sprocket are shown by dotted lines.

Fig. 10 shows a modification similar to that shown at Fig. 8 but with a straight rear axle 12. The guard plate is here shown attached to a circular flange integral with the fitment 11. Fig. 11 is a side view of the frame and the fitment 11, shown at Fig. 10, the guard plate being shown dotted together with the chain and its pinion and sprocket. A boss for the radius rod is shown surrounding the pin 17. I may make any fitment 11 of two or more parts, or with a split boss or bosses to facilitate the assembly or dismantling of the parts concerned.

The gear pinion and wheel or ring wheel, at each side, may have teeth of spur, helical or any other suitable kind.

Throughout the construction herein described any bearing or journal may be of plain, ball or roller type.

The chain sprockets may be made of two or more parts each, and any gear pinion may be formed integral with its shaft or integral with a sleeve to which the chain sprocket may be attached.

For colonial and agricultural use and for operation in difficult country where ample ground clearance is required, the chassis constructed according to this my said invention offers great advantages.

For the conversion of existing chassis for heavier loads and for the building of new machines for loads much heavier than those for which existing components were at first intended, the use of the construction according to this invention offers the cheapest and most efficient solution, seeing that it only involves the provision of new and heavier parts for the rear axle.

What I claim is:—

1. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a second transverse shaft in spaced parallel relationship to the axle of the rear wheels, a torque member supporting said second transverse shaft, a chain sprocket and an interconnected gear pinion mounted upon the end of the second shaft, a toothed wheel on one of said wheels in gear with the aforesaid gear pinion, a chain pinion on the end of the countershaft and a chain between said chain pinion and in said chain sprocket on the end of the aforesaid second shaft, substantially as described.

2. A motor driven vehicle chassis having rear wheels and an axle therefor comprising in combination the Cardan shaft of the motor arranged longitudinally of the chassis, a transverse countershaft carried by said frame of the said chassis and adapted to be driven by said Cardan shaft, a second transverse shaft, torque means mounted upon said axle of the rear wheels, and supporting said second shaft in spaced relationship to the axle of the rear wheels, a chain sprocket and an interconnected gear pinion mounted upon the end of the second shaft, a toothed wheel on one of said wheels in gear with the aforesaid gear pinion, a chain pinion on the end of the countershaft and a chain between said chain pinion in said chain sprocket on the end of the aforesaid second shaft, substantially as described.

3. A motor driven vehicle chassis having rear wheels and an axle therefor comprising in combination, the Cardan shaft of the motor arranged longitudinally of the chassis; a transverse countershaft carried by the frame of the said chassis and adapted to be driven by said Cardan shaft, a second transverse shaft, means secured upon the rear axle supporting said second transverse shaft in spaced parallel relationship to the said wheel axle, an extension on said last named means adapted to be secured to the frame of the chassis, a chain sprocket and an interconnected gear pinion mounted upon the end of the second shaft, a toothed wheel on one of said wheels in gear with the aforesaid gear pinion, a chain pinion on the end of the countershaft and a chain between said chain pinion and in said chain sprocket on the end of the aforesaid second shaft, substantially as described.

4. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a second transverse shaft, means secured upon the rear axle supporting said second transverse shaft in spaced parallel relationship to the said wheel axle, an extension on said last named means, a universally jointed rod for securing the extension with said last named means to the frame of the chassis, a chain sprocket and an interconnected gear pinion mounted upon the end of the second shaft, a toothed wheel on one of said wheels in gear with the aforesaid gear pinion, a chain pinion on the end of the countershaft and a chain between said chain pinion and in said chain sprocket on the end of the aforesaid second shaft, substantially as described.

5. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a second transverse shaft, means secured upon the rear axle supporting said second transverse shaft in spaced parallel relationship to the said wheel axle, a pad on said means adapted to receive a laminated wheel spring, an extension on said last named means, by means of which said extensions and said last named means may be secured to the frame of the chassis, a chain sprocket and an interconnected gear pinion mounted upon the end of the second shaft, a toothed wheel on one of said wheels in gear with the aforesaid gear pinion, a chain pinion on the end of the countershaft and a chain between said chain pinion and in said chain sprocket on the end of the aforesaid second shaft, substantially as described.

6. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a second transverse shaft, means secured upon the rear axle supporting said second transverse shaft in spaced parallel relationship to the said wheel axle, a hinged extension on said last named means by means of which said extension and said last named means may be secured to the frame of the chassis, a chain sprocket and an interconnected gear pinion mounted upon the end of the second shaft, a toothed wheel on one of said wheels in gear with the aforesaid gear pinion, a chain pinion on the end of the countershaft and a chain between said chain pinion and in said chain sprocket on the end of the foresaid second shaft, substantially as described.

7. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a pair of alined transverse shafts in spaced relationship to the axle of the rear wheels, a chain sprocket and an interconnected gear pinion mounted upon each of the said shafts, a toothed wheel on one of the said rear wheels in gear with the aforesaid pinion, a chain pinion on each end of the countershaft, and a chain between each of said chain pinions and those on the end of the two alined shafts substantially as described.

8. A motor driven vehicle chassis comprising in combination the Cardan shaft of the motor arranged longitudinally of said chassis, a cranked rear axle, a transverse countershaft carried by the frame of the said chassis and adapted to be driven by said Cardan shaft, a pair of transverse shafts in spaced relationship to the said rear axle, a pair of members formed integrally with the said axle and carrying said pair of shafts, a chain sprocket and an interconnected gear pinion mounted upon each end of the two shafts, a toothed wheel on each of the rear road wheels in gear with the aforesaid gear pinion, a chain pinion on each end of the countershaft and a chain between each of said chain pinions and the sprocket wheels on the ends of the aforesaid shafts, substantially as described.

9. A motor driven vehicle chassis having rear wheels and an axle therefor comprising in combination the Cardan shaft of the motor arranged longitudinally of the chassis, a transverse countershaft carried by the frame of the said chassis and adapted to be driven by said Cardan shaft, a pair of transverse shafts in spaced relationship to the said rear axle, a pair of members secured upon said rear axle, and carrying said pair of shafts, an extension on said members by which they may be secured to the frame of the chassis, a chain sprocket and an interconnected gear pinion mounted upon each end of the two shafts, a toothed wheel on each of the rear road wheels in gear with the aforesaid gear pinions, a chain pinion on each end of the countershaft and a chain between each of said chain pinions and the sprocket wheels on the end of the aforesaid shafts, substantially as described.

In testimony whereof I have hereunto signed my name to this specification.

JAMES REGINALD CHURCHILL.

Copies of this patent may be obtained for five cents each, by addressing the "Commissioner of Patents, Washington, D. C."